United States Patent [19]
Christian

[11] 3,885,817
[45] May 27, 1975

[54] TRAILER HITCH

[76] Inventor: Fredrick W. Christian, 8725 Baxter Way, Orangevale, Calif. 95662

[22] Filed: Feb. 6, 1974

[21] Appl. No.: 440,170

[52] U.S. Cl. .............................. 280/491 E; 280/495
[51] Int. Cl. .............................................. B60d 1/00
[58] Field of Search ............ 280/491 R, 491 E, 495, 280/491 B

[56] References Cited
UNITED STATES PATENTS

| | | | |
|---|---|---|---|
| 2,569,086 | 9/1951 | Zenk | 280/495 X |
| 2,576,461 | 11/1951 | Kammerer | 280/491 E X |
| 2,639,160 | 5/1953 | Studebaker | 280/491 E X |
| 2,850,293 | 9/1958 | Hall | 280/491 E |
| 3,463,514 | 8/1969 | Warner | 280/495 |
| 3,727,937 | 4/1973 | Maki | 280/491 B X |

*Primary Examiner*—Leo Friaglia
*Attorney, Agent, or Firm*—Harris Zimmerman

[57] ABSTRACT

A trailer hitch removably secured to the rear of a vehicle comprises two laterally extending beams joined end to end, with a rearwardly extending tongue bearing a ball hitch secured to the junction. The distal end of each beam is provided with a depending lug which is adapted to engage a portion of the bumper bracket and define the lateral position of the trailer hitch with respect to the vehicle. Bolts received in each distal end of the beams are secured to plates below the bumper bracket, affixing the trailer hitch to the vehicle and transmitting the trailer tongue load directly to the bumper brackets.

3 Claims, 6 Drawing Figures

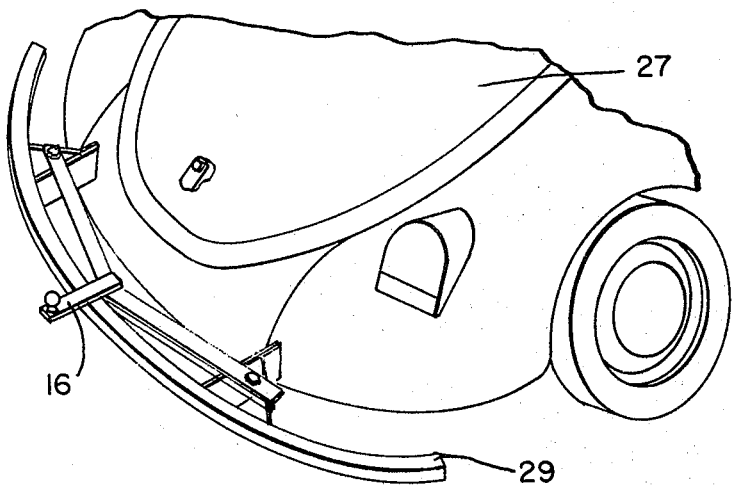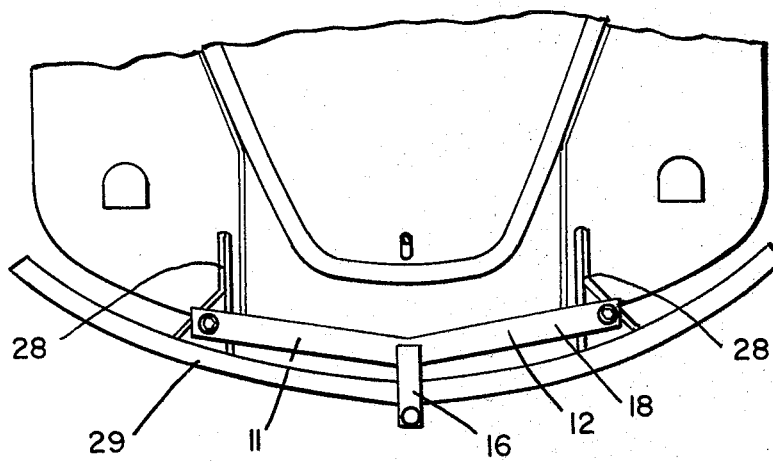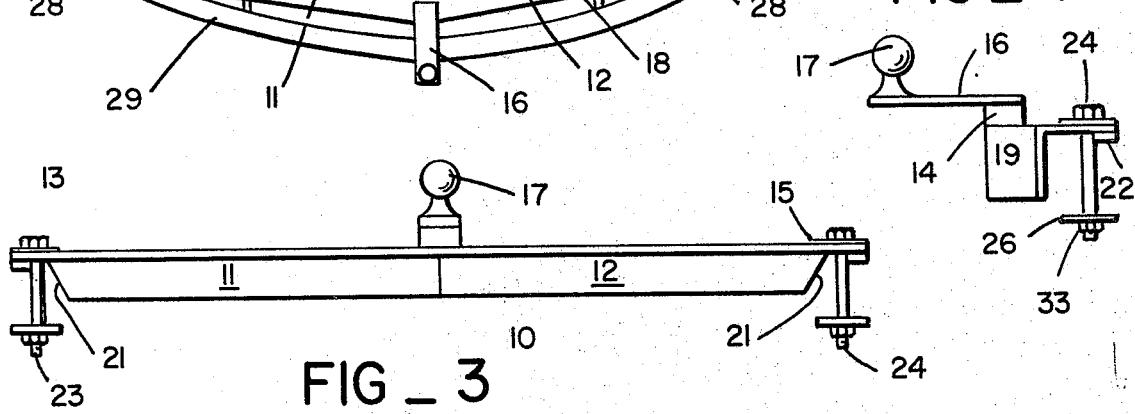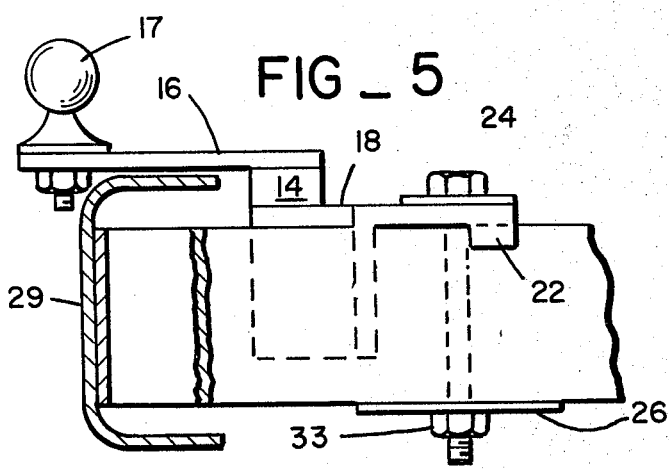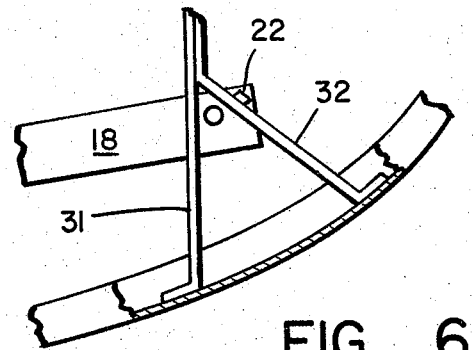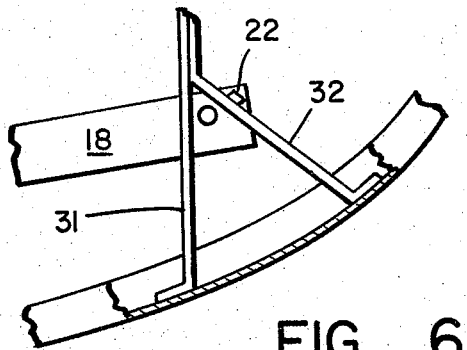

TRAILER HITCH

BACKGROUND OF THE INVENTION

A variety of trailer hitches adapted to be removably secured to a vehicle pressed into service as a towing vehicle are known in the prior art. Some of these hitches comprise tongues supported on frames which are bolted or clamped to the rear chassis or undercarriage of the vehicle. This form of trailer hitch often causes great inconvenience in securing the frame underneath the vehicle. Furthermore, these hitches are unsuitable for use with vehicles having rear-mounted engines and transmissions, due to possible interference with the drive train mechanism. For these and other reasons, the chassis hitch has found only limited use.

A more common form of trailer hitch comprises a ball connector secured to a small frame which is clamped or chained to the rear bumper of the vehicle. These hitches transmit all of the tongue load of the trailer to the bumper, which is often supported only by brackets at the ends of the bumper, creating a rather long span which must support the gongue load. Due to the tongue load on this excessive moment arm, these bumper mounted hitches often cause the bumper to bend or break, and may also cause the rear of the vehicle to strike the ground when rolling over bumps or backing down steep driveways. Thus it is apparent that a new form of trailer hitch, one without the defects found in the prior art devices, is most desirable.

THE DRAWING

FIG. 1 is a perspective view of the present invention installed on a vehicle.

FIG. 2 is a top view of the present invention installed on a vehicle.

FIG. 3 is a rear elevation of the present invention.

FIG. 4 is a side view of the present invention.

FIG. 5 is a detailed side view of the mounting of the present invention on a vehicle.

FIG. 6 is a bottom view of a portion of the present invention.

DESCRIPTION OF THE PREFERRED EMBODIMENT

The present invention provides a trailer hitch for vehicles for which chassis hitches are not suitable or practical, and which have bumpers unable to support the burden of a trailer load. As shown in the accompanying figures, the trailer hitch includes lateral members 11 and 12, which may be formed of angle iron or the like. The lateral members are joined end-to-end at a junction 10, with the distal ends 13 and 15 of the respective lateral members disposed in a plane forward of the junction 10. A block 14 is welded or otherwise secured to the upper surface of the junction 11. One end of a rearwardly extending tongue 16 is secured to the top surface of the block, and to the other end of the tongue a ball connector 17 for a trailer is secured.

Each lateral member 11 and 12 includes a horizontal portion 18 and a vertically extending portion 19. At each end 13 and 15 of the lateral members the vertically extending portion 19 is foreshortened with a beveled edge 21. Subjacently depending from the horizontal portion 18 at each end 13 and 15 is a lug 22. Although the lug 22 as shown in FIG. 6 is shown as rectangular in cross-section, it should be noted that the configuration of the lug may be altered to suit the mounting situation, the primary function of the lug being to contact the bumper bracket arms (to be hereinafter discussed) in a manner to prevent multidirectional slippage therebetween. Bolts 23 and 24 are received through holes in ends 13 and 15, respectively, each bolt supporting a plate 26 which receives the bolt therethrough.

The trailer hitch is secured to the rear of a vehicle 27 by means of the existing bumper brackets 28 which support the bumper 29. Although the bumper bracket depicted herein includes diverging arms 31 and 32, it should be appreciated that the present invention may be employed with a great variety of vehicles having various forms of bumper brackets. The trailer hitch is positioned with each lug 22 disposed adjacent to and exterior to arm 32 of the bumper bracket, the lugs impinging on the arms 32 to provide lateral positioning and prevent lateral or longitudinal slippage. The bolts 23 and 24 depend between arms 31 and 32, the plate 26 impinging on the lower edges of arms 31 and 32. The hitch is secured to the bumper bracket by means of nuts 33 which when tightened cause the plates 26 and the ends of the lateral members to clamp the bumper bracket therebetween.

It should be noted that the present trailer hitch transfers all of the trailer load applied to the ball connector directly to the bumper brackets. Also, the tongue and ball connector do not bear on the bumper itself, as shown in FIG. 5, so that no load is applied to the bumper. Furthermore, all of the structure which comprises the present invention, with the exception of the end of the tongue and ball connector, lies between the bumper and body of the towing vehicle. Thus, the trailer hitch is protected by the existing vehicle bumper structure, and, conversely, the trailer hitch poses no safety hazard when the vehicle is moving rearwardly. It should also be noted that the trailer hitch does not reduce the ground clearance of the vehicle.

I claim:

1. A tow hitch comprising a pair of horizontally disposed members defining an obtuse angle of less than 180° therebetween, a draft bar extending from the medial connected portions of said members, each of said members having a generally horizontally disposed portion, and a generally vertically disposed web portion extending downwardly therefrom, bolt means extending through the respective end portions of the horizontal portions of said members, and plate means adjustably positioned on said bolt means for securing said apparatus to a draft vehicle.

2. A tow hitch including a horizontally disposed member, a draft bar extending from the medial portion of said member, said member including a generally horizontally disposed portion, and a generally vertically disposed web portion extending downwardly therefrom, bolt means extending through the respective end portions of the horizontal portions of said member, plate means adjustably positioned on said bolt means for securing said tow hitch to a draft vehicle, and a pair of lugs, each lug extending downwardly from an end of said horizontally disposed member and adapted to engage portions of said draft to prevent relative lateral motion of said tow hitch and said draft vehicle.

3. The tow hitch of claim 2, wherein said plate means comprises a pair of plates, each disposed subjacent to said respective end portions of said member, and each of said plates including a hole disposed medially therein for receiving said bolt means therethrough.

* * * * *